Sept. 8, 1964  H. W. McDONOUGH  3,147,634
EXPANDING PULLEYS
Filed Aug. 7, 1962
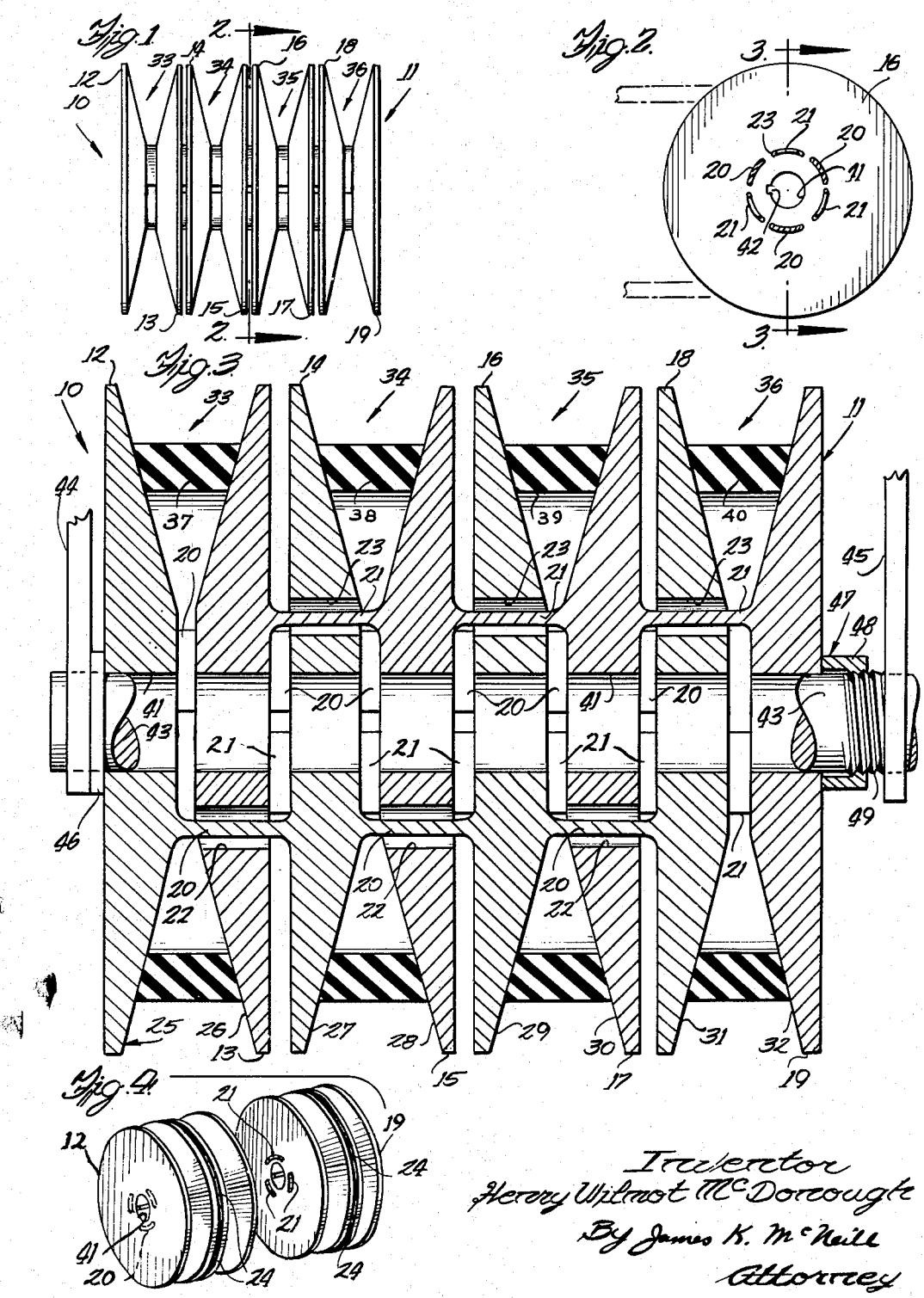

United States Patent Office 3,147,634
Patented Sept. 8, 1964

3,147,634
EXPANDING PULLEYS
Henry Wilmot McDonough, R.R. 1, Box 346,
Miller Road, Dundee, Ill.
Filed Aug. 7, 1962, Ser. No. 215,369
3 Claims. (Cl. 74—230.17)

This invention relates to pulleys, particularly of the expanding type and to a method for the manufacture thereof.

Conventional variable pitch diameter pulleys, particularly multiple groove pulleys or sheaves consist of a great many parts. A two-groove pulley, for example, consists of four separate disks or flanges, adjacent pairs of which are provided with inclined or coned faces forming V-shaped grooves in which drive belts are received. The uses of such pulleys in transmissions and the like to secure variable speed drive are well known. By axially shifting one disk or set of disks relative to the other the diameter of the circumference along which the belt is applied to the pulleys may be adjusted to cause the drive belts to move radially inwardly or outwardly and vary the angular velocity of the pulleys.

The fact that such pulleys are made of a large number of separate parts is a serious disadvantage. Each disk or flange is individually assembled on a shaft, the disks forming one side of the grooves of a multiple groove pulley assembly being separated by spacers and secured together by elongated bolts and the like, and the other set of complementary disks being separately secured together by bolts and axially shiftable relative to the other set.

Not only is the assembly and disassembly of such a multiple groove pulley assembly time-consuming and therefore costly, but the pulleys are unstable and subject to vibration, erratic operation and rapid wear.

Therefore, an object of my invention is the provision of a novel expanding pulley assembly and a simple and efficient method for its production.

Another object of the invention is the provision of an expanding or variable pitch diameter pulley assembly formed of a minimum number of parts and characterized by rigidity, stability and long life.

Another object of the invention is the provision, in a multiple groove expanding pulley, of a pair of complementary disk units, each of which comprises a one-piece, unitary assembly of a plurality of integrally connected and axially spaced disks interfitted and interlocked with the other said disk unit for axial displacement relative thereto to form a simple and economical multiple groove variable pitch diameter pulley assembly for use in drive transmissions and the like.

A further object of the invention is the provision of a multiple groove variable pitch diameter pulley or sheave assembly consisting of only two parts cast in a mold to provide a pair of interfitted and interlocked multiple disk units each of which comprises a plurality of spaced flanges or disks having inclined or coned faces complementary to and alternating with the coned faces of the disks of the other unit to form belt-receiving grooves between adjacent disks, wherein the disks of each unit are spaced by integrally formed connectors and wherein the pulley assembly may be separated into a plurality of smaller multiple groove pulley assemblies by cutting transversely through the spacers between selected adjacent disks. Thus, for example, a cast five-pulley assembly can be severed to form a three-pulley and a two-pulley assembly, and a four-pulley assembly can be cut into two two-pulley assemblies or a single pulley and a three-pulley assembly.

Other objects and advantages of the invention will become clear from the following detailed description when read in conjunction with the accompanying drawings, wherein, FIGURE 1 is a view in side elevation of a four-groove pulley assembly formed according to my invention;

FIGURE 2 is a section taken on the line 2—2 of FIGURE 1, and indicating the position of the drive belts;

FIGURE 3 is an enlarged section taken on the line 3—3 of FIGURE 2, showing position of the drive belts and also the manner in which the pulley assembly is mounted on a shaft and supporting frame; and FIGURE 4 is a perspective view of a pair of pulley assemblies according to this invention, after the four-groove assembly has been severed along a vertical center line between adjacent disks or flanges to form two two-groove pulleys and before the two pulley assemblies have been separated into their components.

It will be noted that the drawings show a four-groove expandable pulley cast by any suitable molding procedure, the details of which form no part of this invention, into a multi-groove assembly such as shown in FIGURE 1. FIGURE 1 shows the pulley assembly after removal from the flask or box, not shown, in which it is cast and is illustrated as an assembly consisting of two disk or flange units, one of which is designated by the numeral 10 and the other by the numeral 11.

Units 10 and 11 are cast in interfitted, interlocked relation, unit 10 comprising four beveled flanges or disks 12, 14, 16 and 18 in fixed axially spaced relationship rigidly interconnected by circumferentially spaced connectors in the form of spacer ribs or lugs 20, cast as an integral part of the whole unit 10. Unit 11 also comprises four beveled flanges 13, 15, 17 and 19 in fixed axially spaced relationship rigidly interconnected by circumferentially spaced connectors in form of spacing ribs or lugs 21, cast as an integral part of the whole unit 11.

As will be clearly seen from FIGURE 3, spacer lugs 20 are slidably received in openings 22 in the respective disks 13, 15 and 17, while lugs 21 are slidably received in openings 23 in the respective disks 14, 16 and 18.

Although additional lugs may be provided, if desired, on end flanges 13 and 18 of the respective units 11 and 10 for reception in corresponding openings in end flanges 12 and 19, such terminal lugs do not function as connectors or spacers and their elimination simplifies the construction of the mold and the pulley assembly. Therefore, the end disks 12 and 19 are shown without openings and the adjacent disks 13 and 18 without lugs for reception therein. As shown particularly well in FIGURE 2, all of the lugs 20 and 21 are curved substantially on the axis of the disk units, and the associated openings 22 and 23 in which they are received are slots likewise curved to conform to the shape thereof.

Where a single pulley is formed, for example by cutting the right hand pair of flanges or disks from the assembly of FIGURE 3, the disk 18 is provided with openings 23 to receive the ribs 21 of disk 19, the ribs being curved substantially on the axis of the disks providing a hub structure which form an unusually strong and economical expanding pulley.

In the process of casting the pulley shown in the drawings, adjacent disks such as 13-14, 15-16 and 17-18 are preferably joined at their peripheries by sufficient metal, as indicated at 24 in FIGURE 4, to form a rigid assembly in which there is no play between the two units 10 and 11. This facilitates machining operations, particularly on the inclined belt-engaging faces of the disks, the inclined conical faces 25, 27, 29 and 31 of the respective disks 12, 14, 16 and 18 forming with the opposed complementary inclined faces 26, 28, 30 and 32 of the disks 13, 15, 17 and 19, four V-shaped grooves designated 33, 34, 35 and 36. Drive belts 37, 38, 39 and 40 are seated in the respective grooves 33 to 36 and are trapezoidal in cross-section to conform to the shape of the grooves.

At this point it should be clear that the structure shown in FIGURES 1 and 3 is a multiple groove expanding pulley which consists of only two parts, and that, although the pulley shown has only four grooves, pulley assemblies having more than four grooves can be cast and severed radially, as indicated in FIGURE 4 to provide one or more expanding pulleys, the stub ends of the severed lugs such as can be seen at 20 in FIGURE 2 being ground even with the face of the disk.

The pulley assembly of this invention is cast with an axial bore 41 and a keyway 42 in each of the disks to receive a shaft 43 having a suitable key, not shown, for cooperation with keyway 42.

In operation, the pulley assembly of this invention, whether a one, two or three-groove assembly or one having four or more grooves, may be mounted as indicated in FIGURE 3 with shaft 43 rotatable in a supporting frame having side members 44 and 45. A washer 46 is disposed between the flat face of end disk 12 and member 44 and a collar 47 is provided with an interiorly threaded portion 48 which cooperates with a threaded section 49 at the end of the shaft.

Belts 37, 38, 39 and 40 drive the pulley assembly shown in FIGURE 3 at a rate of speed determined by the pitch diameter of the pulleys. To adjust the pitch diameter collar 47 is manipulated, turning it counter-clockwise when viewed from the right hand end of FIGURE 3 allowing disk unit to move axially to the right away from unit 10 and belts 37, 38, 39 and 40 to move radially inwardly, decreasing the pitch diameters of the pulley sections and increasing the angular velocity of the entire assembly.

From the foregoing it should be clear that I have devised a stable as well as simple and economical multiple groove expanding pulley assembly and a simple and efficient procedure for its production. It should also be understood that my invention has been described in its preferred embodiment only, and that modifications may be made therein without departing from the spirit of the invention or the scope of the appended claims.

I claim:

1. A variable pitch diameter multiple groove belt pulley assembly including a first disk unit comprising at least two axially spaced integrally formed disks and a second disk unit comprising at least two complementary axially spaced integrally formed disks interfitting and alternating with the disks of said first unit and axially shiftable relative thereto to form at least two pairs of relatively axially adjustable complementary disks, the disks of each said pair having an axial bore and having opposed beveled faces forming a belt-receiving groove, the disks of one said unit being joined by means comprising a plurality of circumferentially spaced ribs adjacent said bore extending between and integral with said disks, the disks of the other said unit being joined by means comprising a plurality of circumferentially spaced ribs extending between and integral with said last mentioned disks and circumferentially displaced from and alternating with said ribs of said one disk unit, the disks of each of said units having recesses therein adjacent said bore to slidably receive the ribs of the other of said units to accommodate axial movement of one said unit relative to the other.

2. A variable pitch diameter multiple groove belt pulley assembly including a first disk unit comprising at least two axially spaced integrally formed disks and a second disk unit comprising at least two complementary axially spaced integrally formed disks interfitting and alternating with the disks of said first unit and axially shiftable relative thereto to form at least two pairs of relatively axially adjustable complementary disks, the disks of each said pair being axially bored and having opposed beveled faces forming a belt-receiving groove, the disks of one said unit being joined by means comprising at least one arcuately shaped rib extending between and integral with adjacent disks of said unit, the disks of the other said unit being joined by means comprising at least one complementary arcuately shaped rib extending between and integral with adjacent disks of said other unit and circumferentially displaced from and alternating with the rib connecting the disks of said one unit to form a substantially circumferentially continuous hub, the disks of each of said units having openings therein to slidably receive the ribs of the other of said units.

3. A variable pitch diameter multiple groove belt pulley assembly comprising a first unitary series of axially spaced integrally joined disks, a second unitary series of axially spaced integrally joined disks interfitting in axial alignment with and axially adjustable relative to the disks of said first series to form pairs of adjacent relatively axially adjustable disks, said disks having a relatively small axial bore, the opposed faces of the disks of each pair of disks having a radially inner face portion of relatively small area concentric with said bore and an outer beveled face portion of relatively large area to form between each pair of disks a relatively deep V-shaped groove, means forming the said integral connection between the disks of each said series, comprising a plurality of arcuately shaped ribs concentric with and adjacent said bore, said ribs connecting adjacent disks of one of said series being circumferentially displaced from and alternating with the ribs connecting adjacent disks of the other of said series to form a substantially circumferentially continuous hub, each of the disks of one said series having recesses therein conforming to the shape of and slidably receiving the ribs connecting adjacent disks of the other of said series to accommodate relative axial movement between said first and second series of disks.

References Cited in the file of this patent

UNITED STATES PATENTS

| 2,130,823 | Wilson | Sept. 20, 1938 |
| 2,221,166 | Heinrich et al. | Nov. 12, 1940 |

FOREIGN PATENTS

| 833,337 | Great Britain | Apr. 21, 1960 |